United States Patent
Chakkera et al.

(10) Patent No.: US 9,587,732 B2
(45) Date of Patent: Mar. 7, 2017

(54) TRANSLATING NUT MECHANISMS HAVING ENHANCED LUBRICATION FEATURES AND VARIABLE BLEED VALVE SYSTEMS EMPLOYING THE SAME

(71) Applicant: HONEYWELL INTERNATIONAL INC., Morristown, NJ (US)

(72) Inventors: Kevin K. Chakkera, Chandler, AZ (US); Brent Bristol, Phoenix, AZ (US); Sean Countryman, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 166 days.

(21) Appl. No.: 14/606,781

(22) Filed: Jan. 27, 2015

(65) Prior Publication Data

US 2016/0215870 A1    Jul. 28, 2016

(51) Int. Cl.
  *F16H 57/04*   (2010.01)
  *F16H 25/24*   (2006.01)
  *F16K 31/50*   (2006.01)

(52) U.S. Cl.
  CPC ......... *F16H 57/0471* (2013.01); *F16H 25/24* (2013.01); *F16H 57/045* (2013.01); *F16H 57/0456* (2013.01); *F16K 31/508* (2013.01)

(58) Field of Classification Search
  CPC .... F16H 57/0471; F16H 25/24; F16H 57/045; F16H 57/0456; F16K 31/508
  USPC ................ 251/355, 264, 266–267, 273–274; 74/89.44; 184/6
  See application file for complete search history.

(56) References Cited

U.S. PATENT DOCUMENTS

| | | | | |
|---|---|---|---|---|
| 1,171,120 A | * | 2/1916 | Hatz ..................... | F16K 31/508 251/355 |
| 1,374,774 A | * | 4/1921 | Solomon ................. | F16K 41/14 251/355 |
| 1,821,929 A | * | 9/1931 | Cornner .................. | F16K 17/00 251/355 |
| 1,871,965 A | * | 8/1932 | Du Bois ................. | F16K 3/262 251/266 |
| 1,971,770 A | | 8/1934 | Cooke | |
| 2,011,087 A | * | 8/1935 | Sherman ................. | F16K 27/08 251/355 |

(Continued)

FOREIGN PATENT DOCUMENTS

WO    02093716 A1    11/2002

*Primary Examiner* — John Bastianelli
(74) *Attorney, Agent, or Firm* — Lorenz & Kopf, LLP (57) ABSTRACT

Embodiments of translating nut mechanism having enhanced lubrication features are provided, as are embodiments of variable bleed valve systems employing translating nut mechanism in the form of bidirectional stop mechanisms. In one embodiment, the translating nut mechanism comprises a housing containing a pool of grease or another lubricant. A screw shaft is mounted in the housing for rotation about a working axis. A translating nut is threadably mounted to the screw shaft and moves linearly along the working axis with rotation of the screw shaft. A first lubricant distribution feature, such as a grease paddle, projects from the translating nut into the lubricant pool. The first lubricant distribution feature moves through the lubricant pool to distribute lubricant within the translating nut mechanism as the translating nut moves along the working axis.

20 Claims, 4 Drawing Sheets

(56) References Cited

U.S. PATENT DOCUMENTS

| | | | | |
|---|---|---|---|---|
| 2,139,280 | A | * | 12/1938 | McBride ................. F16K 27/07 251/355 |
| 3,043,555 | A | * | 7/1962 | Breher ...................... F16K 3/28 251/355 |
| 6,000,308 | A | | 12/1999 | LaFountain et al. |
| 6,450,295 | B1 | * | 9/2002 | Tsukada .............. F16H 25/2418 184/5 |
| 2005/0255186 | A1 | * | 11/2005 | Hiraga ................... B29C 45/83 74/89.44 |
| 2006/0163519 | A1 | * | 7/2006 | Shindo ................... F16K 51/02 251/355 |

* cited by examiner

TRANSLATING NUT MECHANISMS HAVING ENHANCED LUBRICATION FEATURES AND VARIABLE BLEED VALVE SYSTEMS EMPLOYING THE SAME

TECHNICAL FIELD

The present invention relates generally to translating nut mechanisms and, more particularly, to bidirectional stop mechanisms and other translating nut mechanisms having enhanced lubrication features, as well as to variable bleed valve systems employing bidirectional stop mechanisms.

BACKGROUND

In certain instances, an aircraft actuation system can include a translating nut mechanism; that is, a mechanical device containing an externally-threaded shaft (referred to herein as a "screw shaft"), which rotates to drive the linear movement of a translating nut along the screw shaft. As a specific example, aircraft engine are often equipped with Variable Bleed Valve (VBV) systems, which include a particular type of translating nut mechanism referred to as a "bidirectional stop mechanism." Within a given VBV system, the bidirectional stop mechanism may be coupled between a drive motor (e.g., a fuel-powered motor) and a number of bleed valves, which are linked by one or more flexible rods or "flex shafts." During operation of the VBV system, the drive motor rotates the flex shafts to move the bleed valves between a range of positions and thereby control the rate at which airflow is bled from the main gas path of the engine. The bidirectional stop mechanism limits the rotational range of the flex shafts to prevent the drive motor from attempting to rotate the bleed valves beyond their fully closed or fully opened positions. In so doing, the bidirectional stop mechanism reduces component wear and decreases the likelihood of damaging the flex shafts, the bleed valves, and the other components of the VBV system.

Adequate lubrication is typically important to ensure proper and prolonged operation of a translating nut mechanism. In many cases, adequate lubrication can be provided by packing the translating nut mechanism with grease during original manufacture such that relubrication is seldom, if ever, required. In other cases, however, a translating nut mechanism may require relubrication at relatively frequent intervals. The lubrication requirements of a translating nut mechanism are highly dependent upon the operational demands placed on the mechanism, as well as the severity of the environmental conditions to which the mechanism is exposed. Consider, for example, a bidirectional stop mechanism of the type described above. In applications wherein movement of the translating nut and screw shaft are relatively limited, as may be the case wherein the nut is moved between a number of preset positions in accordance with commands issued by an analog engine controller, the bidirectional stop mechanism may require little to no relubrication over its service life. Conversely, relatively frequent relubrication or regreasing of the bidirectional stop mechanism may be appropriate when greater demands are placed on the mechanism due to, for example, usage in conjunction with a digital engine controller, which commands frequent, incremental movements of the shaft and nut. Unfortunately, the location and structural surrounding of the bidirectional stop mechanism can render relubrication a cumbersome and time consuming process potentially requiring removal and disassembly of the stop mechanism.

There thus exists an ongoing need to provide embodiments a VBV system including a bidirectional stop mechanism having lubricant enhancing features, which can decrease the frequency at which relubrication is required and/or facilitate relubrication of the mechanism without removal and overhaul during engine maintenance. More generally, it is desirable to provide embodiments of a translating nut mechanism offering one or more of the above-noted benefits and regardless of whether the mechanism assumes the specific form a bidirectional stop mechanism. Other desirable features and characteristics of the present invention will become apparent from the subsequent Detailed Description and the appended Claims, taken in conjunction with the accompanying Drawings and the foregoing Background.

BRIEF SUMMARY

Embodiments of bidirectional stop mechanisms and other translating nut mechanisms having enhanced lubrication features are provided. In one embodiment, the translating nut mechanism comprises a housing containing a pool of grease or another lubricant. A screw shaft is mounted in the housing for rotation about a working axis. A translating nut is threadably mounted to the screw shaft and moves linearly along the working axis with rotation of the screw shaft. A first lubricant distribution feature, such as a grease paddle, projects from the translating nut into the lubricant pool. The first lubricant distribution feature moves through the lubricant pool to distribute lubricant within the translating nut mechanism as the translating nut moves along the working axis.

In another embodiment, the translating nut mechanism includes a housing, a screw shaft rotatably mounted in the housing, and a translating nut threadably mounted to the screw shaft. The translating nut includes, in turn, a annular body having a threaded inner circumferential surface engaging the screw shaft. A lubricant injection port is formed in the annular body and directs lubricant to the threaded inner circumferential surface when lubricant is injected into the lubricant injection port. A fitting is installed in the lubricant injection port and is configured to deter the outflow of lubricant from the annular body through the lubricant injection port, while permitting the inflow of lubricant into the annular body when lubricant is injected through the lubricant injection port.

Embodiments of a variable bleed valve system are also provided, which include a translating nut mechanism in the form of a bidirectional stop mechanism. In one embodiment, the variable bleed valve system includes a plurality of bleed valves, a drive motor coupled to plurality of bleed valves and configured to move the bleed valves between open and closed positions, and a bidirectional stop mechanism coupled between the plurality of bleed valves and the drive motor. The bidirectional stop mechanism includes, in turn, a housing containing a lubricant pool, a screw shaft mounted in the housing and rotatable about a working axis, and a translating nut threadably mounted to the screw shaft and moving linearly along the working axis with rotation of the screw shaft. A first lubricant distribution feature, such as a radially-projecting grease paddle, extends from the translating nut into the lubricant pool. The first lubricant distribution feature moves through the lubricant pool to distribute lubricant within the translating nut mechanism as the translating nut moves along the working axis.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. As appearing herein, the term "screw shaft" refers to an externally-threaded shaft to which a translating nut is mounted.

The following describes embodiments of translating nut mechanisms having enhanced lubrication features, which can decrease the frequency at which relubrication is required and/or which can facilitate relubrication of the mechanism, when needed. The enhanced lubrication features can include grease paddles or other lubrication distribution features, which extend radially from a translating nut and into a lubricant pool held within a lower portion of the mechanism housing. As the nut moves along a screw shaft, the grease paddles distribute lubricant from the lubricant pool to other components within the housing. For example, in embodiments wherein the screw shaft is supported by rolling element bearings, the paddles are advantageously positioned to urge the flow of grease or another lubricant into the bearings as the translating nut is moved into its translational extremes. In this manner, the lubrication distribution features promote recurrent relubrication of the bearings and other components of the mechanism to maintain the translating nut mechanism in a well-lubricated state over an extended operational period. Additionally or alternatively, the translating nut mechanism can also include features facilitating thorough relubrication of the components contained within the mechanism without disassembly or removal from its surrounding environment. For example, the translating nut can be produced to include a lubricant injection port and an associated fitting, which allow the direct supply of lubricant to the threaded nut-shaft interface during maintenance. In certain cases, the translating nut may also include an internal lubricant reservoir, which retains a portion of the lubricant received through the lubricant injection port. The retained volume of lubricant may then gradually seep-out from the reservoir as the nut translates along the shaft to provide additional lubrication of the threaded nut-shaft interface in a time-release manner and thereby help further decrease the frequency at which relubrication of the mechanism is required.

Embodiments of the translating nut mechanism are advantageously implemented as bidirectional stop mechanisms of the type included within aircraft engine Variable Bleed Valve (VBV) systems. When realized as such, embodiments of the bidirectional stop mechanisms can increase the cycle count or hour count before relubrication is required during maintenance and/or can facilitate relubrication without removal from the aircraft engine and potential disassembly of the stop mechanism. These are significant benefits in the context of aircraft maintenance. For this reason, the following description focuses on an exemplary embodiment of the translating nut mechanism realized as a bidirectional stop mechanism included within a VBV system. It is emphasized, however, that the translating nut mechanism can assume other forms and can be utilized in other applications when it is desirable to prolong the time period over which the mechanism operate in a well-lubricated state and/or when it is desirable to facilitate thorough relubrication of the mechanism during maintenance thereof. While primarily described below as containing grease, it will be appreciated that the bidirectional stop mechanism and, more generally, the translating nut mechanism can contain other types of lubricant, such as oil, in alternative embodiments.

Figure 1:
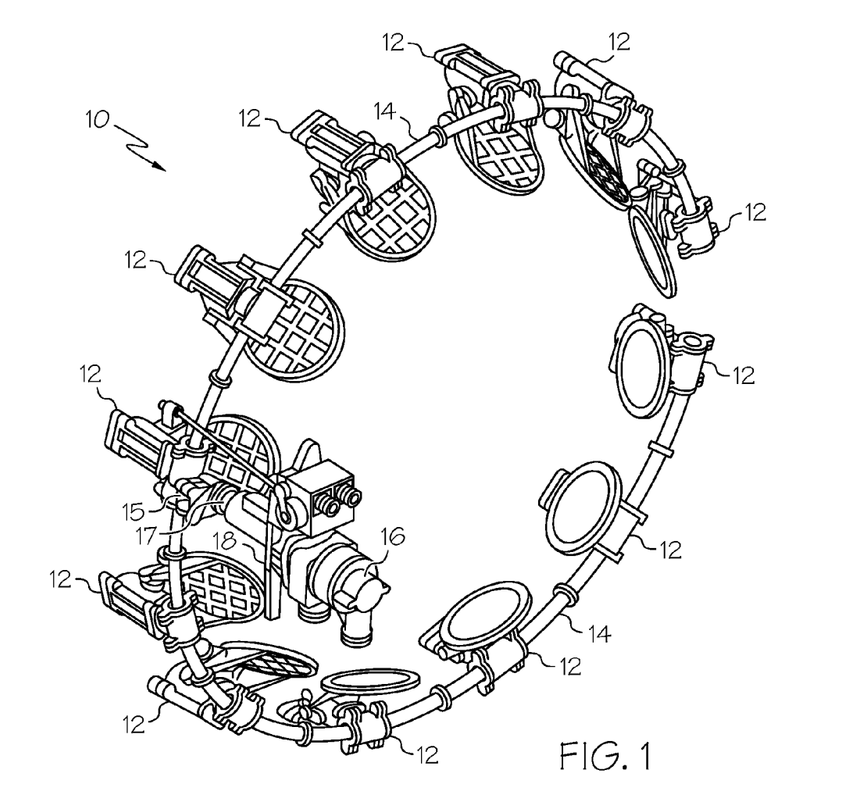
FIG. 1 is an isometric view of a variable bleed valve system including a bidirectional stop mechanism having enhanced lubrication features, as illustrated in accordance with an exemplary embodiment of the present invention.

FIG. 1 is an isometric view of a VBV system 10, as illustrated in accordance with an exemplary embodiment of the present invention. VBV system 10 includes a number of bleed valves 12, which are arranged in an annular formation and mechanically linked by two flexible rods or "flex shafts" 14. When VBV system 10 is integrated into an aircraft engine, bleed valves 12 are positioned around the engine core at a bleed air extraction point, which may be located within the intake or compressor section of the engine. The air bled from the main gas path is directed into a bypass flow path and utilized for cooling or another purpose. Additionally, VBV system 10 can be controlled such that air is selectively bled from an engine's compressor section to maximize the efficiency of the compressor stages, while reducing stall or surge of the compressor vanes during engine operation. Flex shafts 14 extend in opposing directions from a master actuator 15, which is shown a roughly a 9'clock position in FIG. 1. Master actuator 15 is coupled to a drive motor 16 (e.g., a fuel-powered motor) by way of a linking shaft 17, which may be a rigid shaft or a flexible shaft similar to flex shafts 14. During operation of VBV system 10, drive motor 16 rotates linking shaft 17 to drive rotation of flex shafts 14 through master actuator 15 and selectively move valves 12 between a range of angular positions. When in a fully closed position, bleed valves 12 cover bleed air orifices provided in the engine casing (not shown) to prevent or at least minimize bleed airflow. When it is desired to increase the rate at which bleed air is extracted from the main gas path, a Full Authority Digital Engine Controller (FADEC) or other engine controller commands drive motor 16 to rotate linking shaft 17 and, in turn, flex shafts 14 such that bleed valves 12 move into partially opened or fully opened positions. During flight of the aircraft, the engine controller commands drive motor 16 to selectively adjust the angular position of bleed valves 12 to control the rate at which bleed air is extracted from the engine's main gas flow path in accordance with a preset flight schedule, changing environmental conditions, and/or varying operational parameters of the engine.

VBV system 10 may lack a direct feedback control loop or another means for quickly deactivating drive motor 16 after rotating link shaft 17 through its desired range of motion. As a result, drive motor 16 can potentially attempt to over-rotate liking shaft 17, flex shafts 14, and bleed valves 12 in a particular rotational direction, which may cause undesired shaft winding and the exertion of excessive force on valves 12. To protect bleed valves 12 and the other VBV components from such mechanical stress, VBV system 10 is further equipped with a bidirectional stop mechanism 18 that limits movement of liking shaft 17 and, therefore, flex shafts 14 to a rotational range corresponding to the desired angular range of valves 12. If, for example, drive motor 16 rotates linking shaft 17 by a predetermined number of rotations (e.g., 30-40 rotations) in a first direction to move bleed valves 12 from their fully closed positions to their fully opened positions, stop mechanism 18 may prevent additional rotation of shaft 17 in the first rotational direction after the predetermined number of shaft rotations has occurred. Conversely, if drive motor 16 rotates linking shaft 17 by the predetermined number of rotations in a second opposing direction to return bleed valves 12 to their fully closed positions, stop mechanism 18 may prevent additional rotation of shaft 17 in the second rotational direction after the predetermined number of shaft rotations has occurred. In many cases, a non-illustrated control system will control the operation of drive motor 16 and normally prevent the over-rotation of linking shaft 17, flex shafts 14, and bleed valves 12, in which case bidirectional stop mechanism 18 may provide the above-described stopping function as a fail safe feature.

Adequate lubrication may be important to ensure proper and prolonged operation of bidirectional stop mechanism 18. Adequate lubrication may be especially vital in instances wherein bidirectional stop mechanism 18 is subject to relatively heavy operational demands due to, for example, usage in conjunction with a FADEC or other digital engine controller commanding frequent, incremental adjustments of the movable components contained within stop mechanism 18 to maximize engine efficiency and fuel economy. In such instances, regreasing of a conventional bidirectional stop mechanism may be recommended or necessitated at relatively frequent internals of, for example, a few thousand cycles or several thousand operating hours. This is undesirable as regreasing of a conventional bidirectional stop mechanism is typically a cumbersome and time-consuming process entailing removal and possible overhaul of the stop mechanism. In contrast to conventional stop mechanisms, bidirectional stop mechanism 18 includes certain enhanced lubrication features, which facilitate regreasing or relubrication without disassembly of mechanism 18 and which can prolong the time period over which mechanism 18 can operate before regreasing is required. Non-limiting examples of these enhanced lubrication features will now be described in conjunction with FIGS. 2-6.

Figure 2:
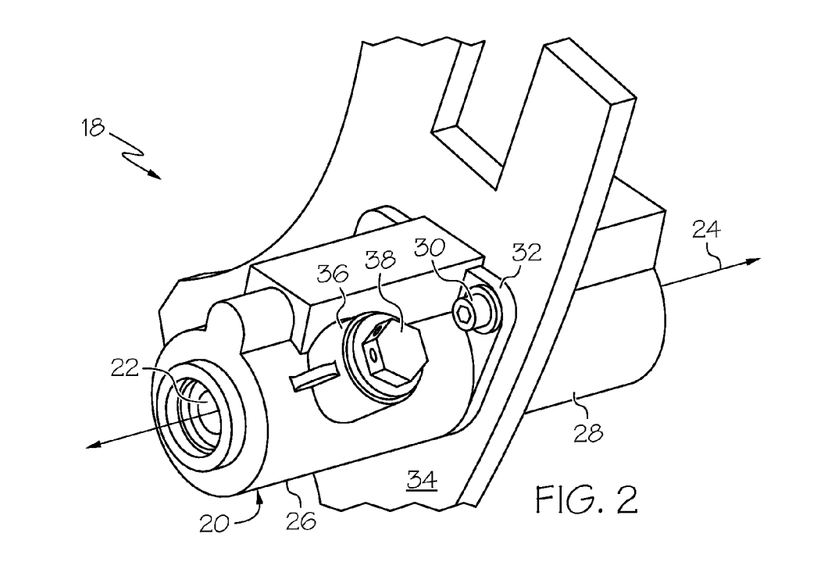
FIG. 2 is a more detailed isometric view of the exemplary bidirectional stop mechanism shown in FIG. 1.

FIG. 2 is an isometric view of bidirectional stop mechanism 18, as illustrated in accordance with an exemplary embodiment of the present invention. Bidirectional stop mechanism 18 includes a housing 20 through which a longitudinal channel 22 extends. As will be described more fully below, channel 22 is at least partially defined by a bore extending through an externally-threaded tube or "screw shaft," which is mounted within housing 20 for rotation about the working axis of stop mechanism 18 (represented in FIG. 2 by double-headed arrow 24). When installed within VBV system 10 (FIG. 1), bidirectional stop mechanism 18 may be positioned adjacent drive motor 16 such that linking shaft 17 extends through channel 22 to master actuator 15. A splined interface is provided between linking shaft 17 and channel 22 such that the rotary output of drive motor 16, linking shaft 17, and the screw shaft contained within stop mechanism 18 are rotationally fixed and turn in unison. As a corollary, when rotation of the screw shaft is prevented, so too is the rotation of the rotary output of drive motor 16 and linking shaft 17. Thus, by limiting the rotational range of the screw shaft within stop mechanism 18, rotation of the rotary output of drive motor 16 and linking shaft 17 can likewise be restricted to a desired range to prevent the over-rotation of flex shafts 14 and bleed valves 12 during operation of VBV system 10 (FIG. 1).

With continued reference to FIG. 2, housing 20 can be a single piece or, instead, assembled from a number of individual pieces, which are joined utilizing mechanical fasteners, utilizing a permanent joinder technique (e.g., welding or soldering), or another means. In the illustrated example, housing 20 is assembled from two mating halves or housing portions 26 and 28, which are joined utilizing a plurality of bolts 30 (only one of which can be seen in FIG. 2). Specifically, housing portion 26 includes a flange 32, which is bolted to a radially-extending wall 34 (e.g., a bracket) projecting from housing portion 28. When installed within VBV system 10 (FIG. 1) and, more generally, when installed on an aircraft engine, wall 34 may be bolted or otherwise attached to the static engine infrastructure (e.g., the nacelle surrounding an engine core) such that housing portion 26 is manually accessible from the exterior of stop mechanism 18 without removal and disassembly thereof. In contrast, access to housing portion 28 may be physically obstructed by surrounding structures, such as the engine nacelle or a wing of the aircraft. As a result, housing portion 28 may be manually inaccessible when bidirectional stop mechanism 18 is installed within VBV system 10 (FIG. 1).

A manual access port 36 is provided on manually-accessible housing portion 26 and can be utilized to access the interior of bidirectional stop mechanism 18 during regreasing. A removable plug 38 (e.g., a threaded metal insert) is disposed in manual access port 36 to seal the interior of stop mechanism 18. Plug 38 can be removed and reinstalled prior and after regreasing of stop mechanism 18, respectively, utilizing a wrench or another specialized tool. Due to the disposition of port 36, the direct application of grease (or other lubricant) dispensed into stop mechanism 18 through manual access port 36 will typically be confined to those components contained within housing portion 26. However, as will be described below, bidirectional stop mechanism 18 is advantageously produced to include certain lubricant distribution features that disperse lubricant supplied through port 36 to the components contained within manually-inaccessible housing portion 28. Examples of such lubricant distribution features will now be described in conjunction with FIGS. 3 and 4.

Figure 3:
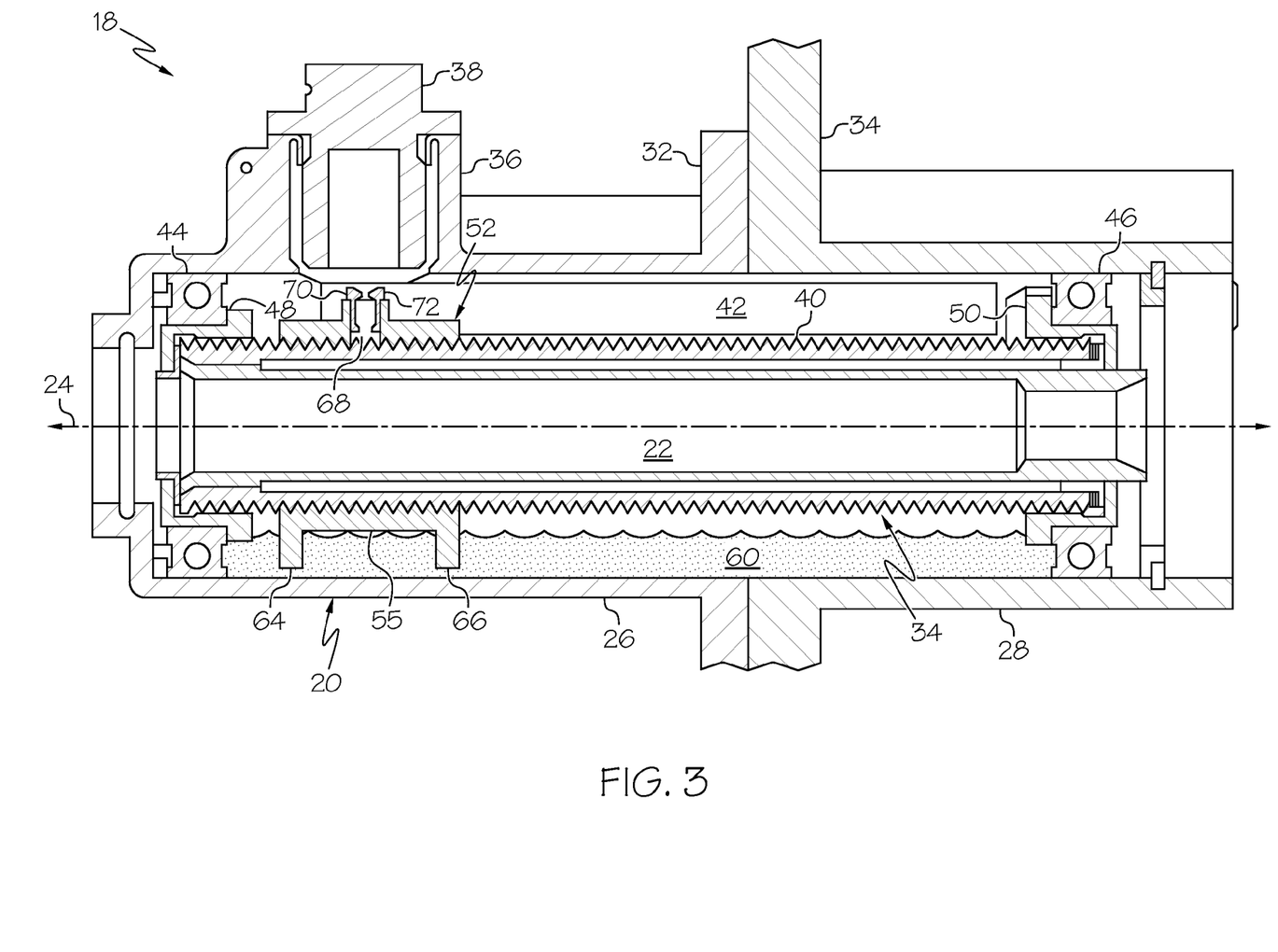
FIGS. 3 and 4 are cross-sectional views of the bidirectional stop mechanism shown in FIGS. 1 and 2, as taken along different cut planes extending parallel to the working axis of stop mechanism.

FIG. 3 is a cross-sectional view of bidirectional stop mechanism 18, taken along a cut plane extending parallel to working axis 24 and through manual access port 36. In this view, the above-referenced screw shaft can be seen and is identified by reference numeral "40." As can further be seen, bidirectional stop mechanism 18 includes an inner chamber or cavity 42 in which screw shaft 40 is mounted for rotation about working axis 24. To facilitate rotation of screw shaft 40 about axis 24, two rolling element bearings 44 and 46 (e.g., ball or roller bearings) are further disposed within housing 20 and support opposing end portions of screw shaft 40. More specifically, rolling element bearing 44 is disposed within housing portion 26 and circumscribes a first end portion of screw shaft 40. A collar 48 is positioned between rolling element bearing 44 and the first end portion of screw shaft 40 affixing the inner ring of bearing 44 to screw shaft 40 and helping to seal cavity 42. Similarly, rolling element bearing 46 is located within housing portion 28 and circumscribes a second, opposing end portion of screw shaft 40. A collar 50 is likewise disposed between rolling element bearing 46 and the second end portion of screw shaft 40 to affix the inner ring of bearing 46 to screw shaft 40 and to partially seal cavity 42. Rolling element bearings 44 and 46 thus circumscribe collars 48 and 50, respectively, as well as screw shaft 40 and the longitudinal channel 22 formed therethrough. The sides of rolling element bearings 44 and 46 facing outwardly or away from translating nut 52 are preferably sealed to deter the ingress of debris into cavity 42 and the fouling of the lubricant contained therein. Annular bearing shields or other sealing elements can be utilized for this purpose. By contrast, the sides of the rolling element bearings 44 and 46 facing inwardly or toward translating nut 52 are preferably left unsealed or open to facilitate the inflow of lubricant into bearings 44 and 46, as described below.

A translating nut 52 is threaded onto screw shaft 40; the term "translating nut," as appearing herein, encompassing any internally-threaded structural element or assembly mounted to a screw shaft and moving linearly with rotation of the shaft. With reference to the exemplary embodiment shown in FIG. 3, rotation of translating nut 52 is prevented by an anti-rotation feature (described below) such that rotation of screw shaft 40 results in linear movement of nut 52 along axis 24. Translating nut 52 is movable between two opposing translational extremes spaced along axis 24: (i) a first translational extreme (the leftmost position in FIG. 3) in which nut 52 is located longitudinally adjacent rolling element bearing 44, and (ii) a second translational extreme (the rightmost position in FIG. 3) in which nut 52 is located longitudinally adjacent rolling element bearing 46. Linear movement of translating nut 52 beyond its first translational extreme can be prevented by a first stop feature provided in bidirectional stop mechanism 18, such as a first non-jamming dog stop formed between collar 48 and a first end of nut 52. Similarly, linear movement of translating nut 52 beyond its second translational extreme can be prevented by a second stop feature provided in stop mechanism 18, such as a second non-jamming dog stop formed between collar 50 and the opposing end of nut 52. When arresting the movement of nut 52 in either translational direction, any loads imparted to collars 48 and 50 may be transferred to the inner walls of housing 20 through the outer rings of bearings 44 and 46, respectively.

Figure 4:
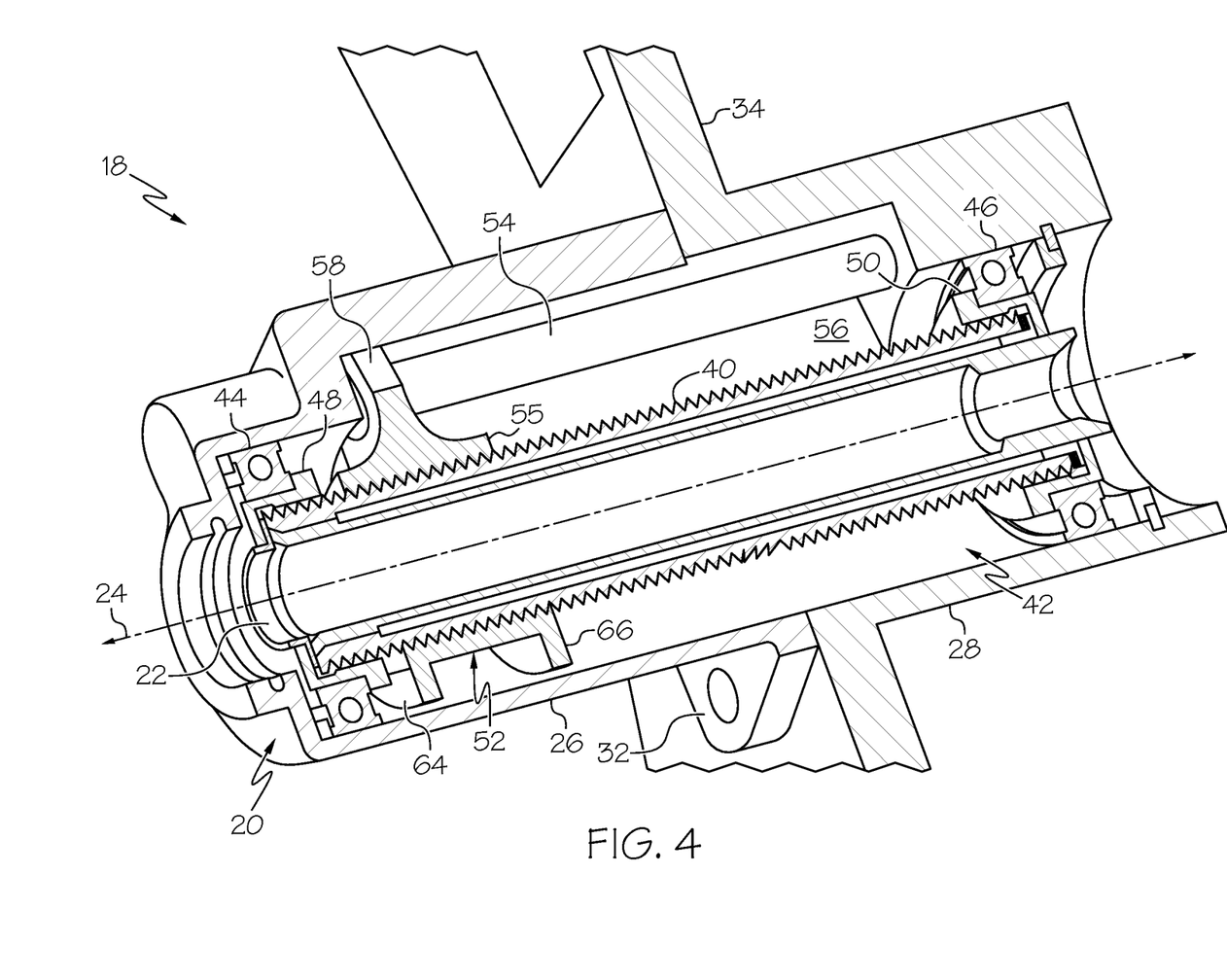
Figure 5:
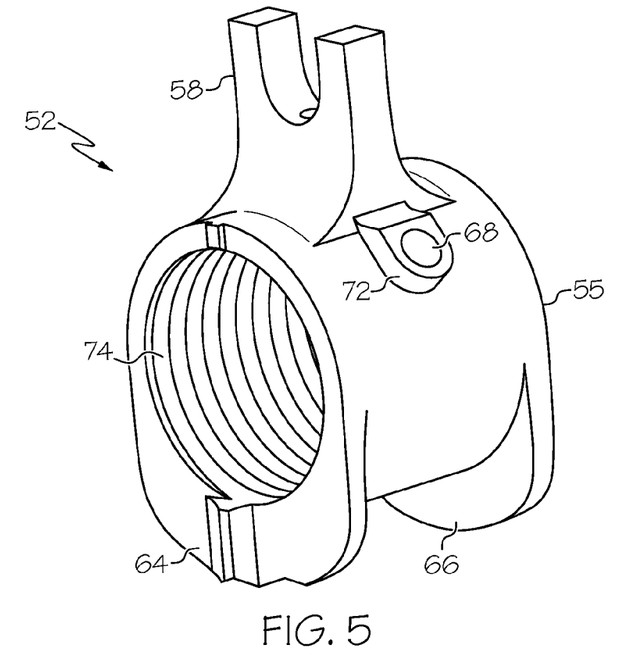
FIGS. 5 and 6 are isometric and cross-sectional views, respectively, of the translating nut included in the bidirectional stop mechanism shown in FIGS. 1-4, as illustrated in accordance with an exemplary embodiment of the present invention.

As noted above, rotation of translating nut 52 is prevented by an anti-rotation feature included within bidirectional stop mechanism 18. The anti-rotation feature can assume any form suitable for preventing the co-rotation of translating nut 52 and screw shaft 40, such as a key and keyway-type interface. In the illustrated example, rotation of translating nut 52 is prevented by a slider-pin interface. This may be more fully appreciated by briefly referring to FIG. 4, which is a cross-sectional view of stop mechanism 18 taken along a cut plane extending parallel to working axis 24 and through the slider-pin interface. As can be seen in FIG. 4, a guide pin 54 is mounted in an elongated recess 56 provided in housing 20 and extends along an axis parallel to working axis 24. Further, a slider 58 (e.g., a pronged structure or forked projection) extends radially from the annular body 55 of translating nut 52 and is fixedly coupled thereto; e.g., slider 58 and nut 52 can be produced as a single machined piece. Slider 58 has an opening or slot through which guide pin 54 extends. By virtue of this structural arrangement, guide pin 54 permits sliding movement of slider 58 and translating nut 52 along axis 24, but prevents rotation of slider 58 and nut 52 thereabout. The slider-pin interface thus prevents the co-rotation of translating nut 52 and screw shaft 40 thereby forcing nut 52 to move linearly along axis 24 with rotation of screw shaft 40.

Prior to usage of stop mechanism 18, housing 20 is filled with grease or another lubricant. The lubricant pools in a lower portion of inner cavity 42 to form a lubricant pool 60, which is represented in FIG. 3 by cross-hatching. As generally illustrated in FIG. 3, the depth of lubricant pool 60 may be such that screw shaft 40 resides above the upper surface pool 60. Similarly, a lower portion of the annular body 55 of translating nut 52 and/or rolling element bearings 44 and 46 may or may not dip into pool 60. In further embodiments, a larger or smaller volume of lubricant may be retained within inner cavity 42 with the depth of pool 60 varying accordingly. For example, in certain embodiments, a greater volume of grease (or other lubricant) may be dispensed into cavity 42 such that screw shaft 40 is partially or fully enveloped by pool 60. Furthermore, the possibility that lubricant pool 60 may fill the entirety or substantial entirety of cavity 42 is not precluded. This will typically be undesirable, however, as the selected lubricant/grease may become relatively viscous or harden at low temperatures. Consequently, prior to warming of the aircraft engine in cold weather conditions, the selected lubricant/grease can potentially impede the movement of rolling element bearings 44 and 46, screw shaft 40, and translating nut 52 if these components are wholly or predominately submerged in pool 60.

Bidirectional stop mechanism 18 further includes one or more lubricant distribution features, which extend from translating nut 52 toward the lower portion of housing 20 and into lubricant pool 60. In the illustrated example, and as shown most clearly in FIG. 3, the lubricant distribution features assume the form of first and second radially-projecting walls or paddles 64 and 66 (referred to hereafter as "grease paddles 64 and 66" with the understanding that lubricants other than grease can be utilized to lubricate mechanism 18 in alternative embodiments). Grease paddles 64 and 66 can be produced as discrete pieces, which are fixedly joined to translating nut 52 in some manner. Alternatively, grease paddles 64 and 66 can be integrally formed with nut 52 as a single machined piece. As shown in FIG. 3, grease paddle 64 extends radially from a first end portion of translating nut 52 in a generally downward direction and into lubricant pool 60. Similarly, grease paddle 66 extends radially from the second, opposing end portion of translating nut 52 in a generally downward direction and into lubricant pool 60. For the purposes of this document, grease paddles 64 and 66 are considered to "extend into" or "project into" lubricant pool 60 even when fully submerged therein. In embodiments wherein grease paddles 64 and 66 are only partially submerged in lubricant pool 60 such that paddles 64 and 66 extend from translating nut 52, through a portion of an air cavity provided in housing 20, and into lubricant pool 60, grease paddles 64 and 66 may be described as extending from nut 52 to "dip into" pool 60.

Grease paddles 64 and 66 extend toward, but preferably do not contact the interior surface of housing 20 defining the lower portion of cavity 42 in which pool 60 is held. Instead, grease paddles 64 and 66 are offset from the inner surface or floor of housing 20 by a relatively small radial gap or clearance (exaggerated in FIG. 3 for clarity). The radial clearance between grease paddles 64 and 66 and the inner surface of housing 20 is preferably large enough to accommodate radial tolerances, but small enough to allow paddles 64 and 66 to effectively push grease or another lubricant into bearings 44 and 46, as described below. In one embodiment wherein grease paddles 64 and 66 each have a radial height $H_R$, as taken along a radius of mechanism 18 (or as taken along an axis perpendicular to working axis 24), the radial clearance can have a radial dimension $C_R$ (as further taken along the radius or second axis) wherein $H_R$ is at least twice $C_R$. By virtue of this structural arrangement, grease paddles 64 and 66 do not interfere with translational movement of translating nut 52, but can effectively push the lubricant towards rolling element bearings 44 and 46 to promote the ingress of lubricant into bearings 44 and 46, as described below.

When translating nut 52 moves into the first positional extreme (the leftmost position in FIG. 3), grease paddle 64 moves into a position longitudinally adjacent rolling element bearing 44, as taken along working axis 24. In so doing, grease paddle 64 urges lubricant to flow through the unsealed side of rolling element bearing 44 and into the raceway thereof. Conversely, when translating nut 52 is moved into the second translational extreme (the rightmost position in FIG. 3), grease paddle 66 moves into a position longitudinally adjacent rolling element bearing 46 and effectively pushes lubricant into the interior of bearing 46. As they rotate with rotation of screw shaft 40, rolling element bearings 44 and 46 take-up the lubricant inflow and distribute the lubricant throughout their respective raceways. This results in thorough relubrication of rolling element bearings 44 and 46. Additionally, some portion of the lubricant taken-up by bearings 44 and 46 may be expelled onto threaded shaft 40 and/or translating nut 52 and then further dispersed over the threads of shaft 40 with the translational movement of nut 52. In this manner, grease paddles 64 and 66 facilitate the recurrent distribution of lubricant throughout the interior of bidirectional stop mechanism 18 to help ensure that mechanism 18 remains well-lubricated over an extended period of time. Forced inflow of lubricant into rolling element bearings 44 and 46 may be particularly effective in prolonging the operational lifespan of mechanism 18.

Figure 6:
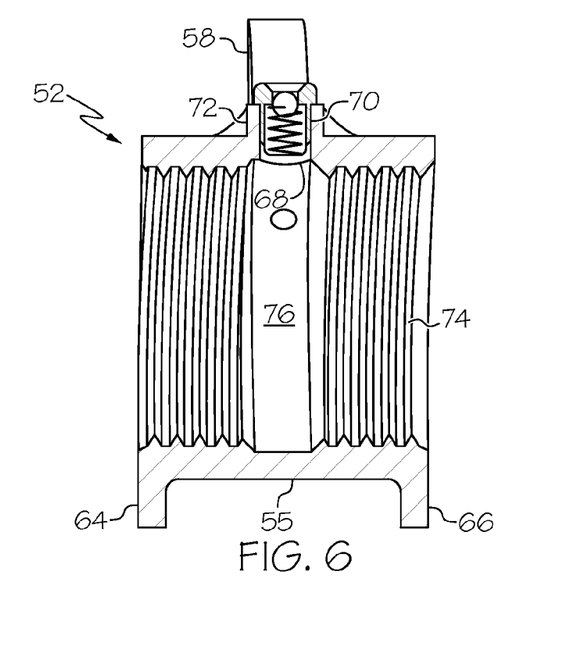

In addition to or in lieu of the above-described lubricant distribution features, bidirectional stop mechanism 18 can also include features facilitating the relubrication of mechanism 18. These features can include, for example, a lubricant injection port 68 and an associated grease fitting 70 carried by translating nut 52. Lubricant injection port 68 is shown in FIG. 3, as well as FIGS. 5 and 6, which are isometric and cross-sectional views of translating nut 52, respectively. Grease fitting 70 is shown in FIGS. 3 and 6. In the illustrated example, lubricant injection port 68 is formed in a generally cylindrical stem or boss 72, which projects radially from annular body 55 of translating nut 52 in a generally upward direction opposite grease paddles 64 and 66. Grease fitting 70 functions to deter the outflow of lubricant from annular body 55 of nut 52 through the lubricant injection port, while permitting the inflow of lubricant into annular body 55 when lubricant is injected through port 68. In one embodiment, grease fitting 70 is a spring-loaded check valve. When translating nut 52 is moved into a predetermined position (referred to herein as the "fill position" and shown in FIG. 3), lubrication injection port 68 aligns radially with manual access port 36 provided through a wall of housing 20. This enables maintenance personnel to readily access lubrication injection port 68 through manual access port 36 during relubrication of stop mechanism 18, as described below.

By way of non-limiting example, the following process can be performed when regreasing or relubricating bidirectional stop mechanism 18. First, translating nut 52 is moved into the fill position shown in FIG. 3. Second, maintenance personal (referred to herein as "the technician") removes plug 38 from manual access port 36. Third, the technician inserts the tip of a grease gun through manual access port 36 and over radially-projecting boss 72. After ensuring the tip of the grease gun is properly fitted around boss 72, the technician then injects grease through fitting 70 and into lubricant injection port 68, which directs the lubricant flow to the threaded inner circumferential surface 74 of translating nut 52 (shown in FIGS. 5 and 6). In this manner, lubricant is supplied directly to the threaded screw-nut interface formed between nut 52 and shaft 40. Translating nut 52 may also help to distribute the lubricant injected into port 68 as nut 52 slides along screw shaft 40. Additionally, some portion of the lubricant may flow or drip onto paddles 64 and 66 for subsequent transfer to rolling element bearings 44 and 46 when translating nut 52 is moved into its translational extremes. If desired, the technician may reposition the grease gun or move translating nut 52 such that additional lubricant can be directed onto other exposed portions of screw shaft 40 during relubrication. The technician then reseals manual access port 36 utilizing plug 38 to complete the relubrication process.

In certain cases, translating nut 52 may be produced to further include a lubricant reservoir, which retains a portion of the lubricant injected into nut 52 through lubricant injection port 68. For example, and as shown most clearly in FIG. 6, the lubricant reservoir can be formed as annular reservoir 76 in the threaded inner circumferential surface 74 of translating nut 52. Specifically, annular reservoir 76 can be formed as ring-shaped groove or undercutting in the threading of translating nut 52 such that reservoir 76 is bounded along its outer circumference by an inner surface of nut 52 and further bounded along its inner circumference by the outer threaded surface of shaft 40. Annular reservoir 76 is fluidly coupled to lubricant injection port 68 and receives a portion of the lubricant injected into port 68. As nut 52 translates along screw shaft 40, the volume of lubricant retained within annular reservoir 76 gradually seeps-out from reservoir 76 to further provide recurrent lubrication of the threaded nut-shaft interface and further prolong the period of time over which the mechanism can operate without relubrication. Moreover, as annular reservoir 76 and port 68 are formed in a central portion of translating nut 52, lubricant will tend to outflow from the body 55 of nut 52 and drip onto both radial paddles 64 and 66 under the influence of gravity. As a result, translating nut 52 may help to gradually distribute lubricant to both rolling element bearings 44 and 46 during operation of stop mechanism 18 as nut 52 is moved between its translational extremes. In other embodiments, the lubricant reservoir may take other, non-annular forms or translating nut 52 may not include such a lubricant reservoir.

The foregoing has thus provided embodiments of translating nut mechanisms having enhanced lubrication features, which can decrease the frequency at which relubrication is required and/or which can facilitate relubrication of the mechanism, as needed. In a preferred embodiment, the lubricant distribution features assume the form of radially-extending paddles; however, the lubricant distribution features can assume any form suitable for moving through a lubricant pool with translation movement of a translating nut such that lubricant is distributed within the mechanism and, preferably, for forcing the inflow of lubricant into one or more rolling element bearings supporting shaft. Additionally or alternatively, the enhanced lubrication features can include a lubricant injection port and associated fitting, which permit direct supply of lubricant to the threaded nut-screw interface when the nut is moved into a predetermined fill position during maintenance. As a still further possibility, the enhanced lubrication features can optionally include a lubricant reservoir (e.g., an annular undercut feature) formed in the interior of the translating nut that gradually distributes lubricant over the threaded nut-screw interface with movement of the nut. When implemented as bidirectional stop mechanism of the type included in VBV systems, specifically, embodiments of the translating nut mechanism including such features can prolong the service life of the stop mechanism and favorably reduce the maintenance requirements of the VBV system.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A translating nut mechanism, comprising:
a housing containing a lubricant pool;
a screw shaft mounted in the housing and rotatable about a working axis;
a translating nut threadably mounted to the screw shaft and moving linearly along the working axis with rotation of the screw shaft; and
a first lubricant distribution feature projecting from the translating nut into the lubricant pool, the first lubricant distribution feature moving through the lubricant pool to distribute lubricant within the translating nut mechanism as the translating nut moves along the working axis; and
the translating nut comprising an annular body having a threaded inner circumferential surface engaging the screw shaft and a lubricant injection port formed in the annular body and directing lubricant to the threaded inner circumferential surface when lubricant is injected into the lubricant injection port.

2. The translating nut mechanism of claim 1 wherein the first lubricant distribution feature comprises a first paddle extending radially from the translating nut into the lubricant pool.

3. The translating nut mechanism of claim 2 wherein the first paddle extends radially from a first end portion of the translating nut, and wherein the translating nut mechanism further comprises a second paddle extending radially from a second, opposing end portion of the translating nut.

4. The translating nut mechanism of claim 1 further comprising a first rolling element bearing disposed in the housing and supporting the screw shaft, the first lubricant distribution feature urging the inflow of lubricant into the first rolling element bearing when the translating nut moves into a first translational extreme adjacent the first rolling element bearing.

5. The translating nut mechanism of claim 4 wherein the first rolling element bearing has a sealed side and an opposing unsealed side, which face away from and toward the translating nut, respectively; and
wherein the first lubricant distribution feature urges lubricant inflow into the first rolling element bearing through the unsealed side when the translating nut moves into the first translational extreme.

6. The translating nut mechanism of claim 1 wherein the translating nut moves toward first and second translational extremes when the screw shaft is rotated in first and second rotational directions, respectively, wherein the translating nut prevents further rotation of the screw shaft in the first direction when the translating nut is moved into the first translational extreme, and wherein the translating nut prevents further rotation of the screw shaft in the second direction when the translating nut is moved into the second translational extreme.

7. The translating nut mechanism of claim 1 wherein the first lubricant distribution feature has a radial height of $H_R$ as taken along a second axis perpendicular to the working axis, and wherein the lubricant distribution feature is separated from an interior surface of the housing by a radial clearance of $C_R$ as taken along the second axis, and wherein $H_R$ is at least twice $C_R$.

8. The translating nut mechanism of claim 1 wherein the translating nut comprises:
an annular body having a threaded inner circumferential surface engaging the screw shaft; and
a lubricant injection port formed in the annular body and supplying lubricant to the threaded inner circumferential surface when lubricant is injected into the lubricant injection port.

9. The translating nut mechanism of claim 8 further comprising a fitting installed in the lubricant injection port, the fitting deterring the outflow of lubricant from the annular body through the lubricant injection port and permitting the inflow of lubricant into the annular body when lubricant is injected through the lubricant injection port.

10. The translating nut mechanism of claim 8 further comprising a manual access port formed through a sidewall of the housing, the manual access port generally aligning with the lubricant injection port in a radial direction when the translating nut is moved into a fill position.

11. The translating nut mechanism of claim 8 further comprising a lubricant reservoir formed in the annular body and fluidly coupled to the lubricant injection port.

12. The translating nut mechanism of claim 11 wherein the lubricant reservoir comprises an annular undercut feature formed in the threaded inner circumferential surface of the annular body.

13. A translating nut mechanism, comprising:
a housing configured to contain a lubricant pool;
a screw shaft rotatably mounted in the housing; and
a translating nut threadably mounted to the screw shaft and moving linearly along the working axis with rotation of the screw shaft, the translating nut comprising:
an annular body having a threaded inner circumferential surface engaging the screw shaft;
a lubricant injection port formed in the annular body and directing lubricant to the threaded inner circumferential surface when lubricant is injected into the lubricant injection port; and
a fitting installed in the lubricant injection port and configured to deter the outflow of lubricant from the annular body through the lubricant injection port, while permitting the inflow of lubricant into the annular body when lubricant is injected through the lubricant injection port; and
a first lubricant distribution feature projecting from the translating nut into the lubricant pool, the first lubricant distribution feature moving through the lubricant pool to distribute lubricant within the translating nut mechanism as the translating nut moves along the working axis.

14. The translating nut mechanism of claim 13 further comprising a manual access port formed in a wall of the housing, the translating nut movable to a fill position in which the lubricant injection port generally radially aligns with the manual access port.

15. The translating nut mechanism of claim 13 wherein the nut further comprises a boss projecting radially from the annular body and through which the lubricant injection port is formed.

16. The translating nut mechanism of claim 13 further comprising:
   a rolling element bearing disposed in the housing and supporting the screw shaft; and
   a paddle projecting from the translating nut and urging the inflow of lubricant into the rolling element bearing when the housing is at least partially filled with a lubricant and the translating nut moves into a position laterally adjacent the rolling element bearing.

17. The translating nut mechanism of claim 13 wherein the translating nut moves toward first and second translational extremes when the screw shaft is rotated in first and second rotational directions, respectively, wherein the translating nut prevents further rotation of the screw shaft in the first direction when the translating nut moves into the first translational extreme, and wherein the translating nut prevents further rotation of the screw shaft in the second direction when the translating nut moves into the second translational extreme.

18. A variable bleed valve system, comprising:
   a plurality of bleed valves;
   a drive motor coupled to plurality of bleed valves and configured to move the bleed valves between open and closed positions; and
   a bidirectional stop mechanism coupled between the plurality of bleed valves and the drive motor, the bidirectional stop mechanism comprising:
      a housing containing a lubricant pool;
      a screw shaft mounted in the housing, rotatable about a working axis;
      a translating nut threadably mounted to the screw shaft and moving linearly along the working axis with rotation of the screw shaft; and
      a first lubricant distribution feature extending from the translating nut into the lubricant pool, the first lubricant distribution feature moving through the lubricant pool to distribute lubricant within the translating nut mechanism as the translating nut moves along the working axis.

19. The variable bleed valve system of claim 18 wherein the bidirectional stop mechanism further comprises a first rolling element bearing supporting a first end portion of the screw shaft, the first lubricant distribution feature pushing lubricant into the first rolling element bearing when the translating nut moves into a position longitudinally adjacent the first rolling element bearing.

20. The variable bleed valve system of claim 19 wherein the bidirectional stop mechanism further comprises:
   a second rolling element bearing supporting a second end portion of the screw shaft; and
   a second lubricant distribution feature pushing lubricant into the second rolling element bearing when the translating nut moves into a position longitudinally adjacent the second rolling element bearing.

* * * * *